(12) United States Patent
Griffin

(10) Patent No.: US 7,639,482 B1
(45) Date of Patent: Dec. 29, 2009

(54) ADJUSTABLE DOCK FOR PORTABLE ELECTRONIC DEVICES

(75) Inventor: Paul Griffin, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 234 days.

(21) Appl. No.: 11/496,553

(22) Filed: Jul. 31, 2006

(51) Int. Cl.
*H05K 5/00* (2006.01)
*H05K 7/00* (2006.01)

(52) U.S. Cl. .................................................. 361/679.1

(58) Field of Classification Search ................. 361/683, 361/686; 439/173, 529, 929, 171, 174, 142
See application file for complete search history.

(56) References Cited

U.S. PATENT DOCUMENTS

| | | | | |
|---|---|---|---|---|
| 4,968,011 A * | 11/1990 | Womack | ...................... | 269/76 |
| 6,049,192 A * | 4/2000 | Kfoury et al. | ............... | 320/113 |
| 6,127,802 A * | 10/2000 | Lloyd et al. | .................. | 320/113 |
| 6,193,546 B1 * | 2/2001 | Sadler | ........................ | 439/534 |
| 6,483,698 B1 * | 11/2002 | Loh | ............................ | 361/686 |
| 6,716,058 B2 * | 4/2004 | Youn | ........................... | 439/535 |
| 7,014,486 B1 * | 3/2006 | Wu et al. | ..................... | 439/248 |
| 7,151,950 B1 * | 12/2006 | Oyang et al. | ............. | 455/556.1 |
| 7,201,611 B2 * | 4/2007 | Faranda | ....................... | 439/638 |
| 7,269,002 B1 * | 9/2007 | Turner et al. | ................ | 361/683 |
| 7,311,541 B2 * | 12/2007 | Chien et al. | .................. | 439/246 |

* cited by examiner

*Primary Examiner*—Chandrika Prasad
(74) *Attorney, Agent, or Firm*—Hornkohl Intellectual Property Law PLLC; Jason C. Hornkohl

(57) ABSTRACT

An adjustable member allows a docking connector for a portable electronic device to accommodate devices having different dimensions. The docking connector is designed to physically and electrically couple to the portable electronic device. The adjustable member alters a distance between a supporting sidewall of the docking connector and an electrical connector that couples to the portable electronic device. The adjust member is preferably a threaded shaft having a support pad for supporting a surface of the portable electronic device. A rotating knob allows a user to extend or retract the support pad on the shaft to engage the side of the portable electronic device. Thus, the docking connector can accommodate devices having different dimensions.

10 Claims, 2 Drawing Sheets

ADJUSTABLE DOCK FOR PORTABLE ELECTRONIC DEVICES

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

A wide variety of portable electronic devices such as cellular telephones, digital music players, laptops, personal data assistants, etc. are available today. Many of these devices have accessories such as chargers, transmitters, speakers that are designed for use with the devices. These accessories are often designed to couple to the portable electronic devices through the use of a dock connector. A dock connector provides an electrical connector for electrically coupling the accessory to the device and a housing that is adapted to physically couple the accessory to the device. Unfortunately, many types of portable electronic devices, such as the Apple iPod™, come in a variety of different configurations. While many of these configurations utilize the same electrical connectors, they often have different sized housings. Thus, accessories having docks for physically coupling to a device must be individually designed for each different size device. While inserts have been used to adapt certain docking accessories for use with different sizes of devices, the inserts are typically difficult to use, easily lost and must be individually designed for each different device size. Therefore, in light of the above discussed deficiencies in the prior art, what is needed is a dock for a portable electronic device that can physically couple to a variety of devices having differing dimensions.

BRIEF SUMMARY OF THE INVENTION

An embodiment of the present invention is directed toward an accessory, such as a charger, for use with a portable electronic device. The accessory has a docking connector having an extendable portion for altering a distance between a supporting side of the docking connector and an electrical connector of the docking connector such that the docking connector can supportingly receiving portable electronic devices having at least two different outer dimensions. The extendable portion is preferably a threaded member having a support pad for supporting a surface of the portable electronic device and knob for rotating the threaded member to extend the support pad to support the portable electronic device. The extendable portion is permanently coupled to the docking connector such that it can not be lost or misplaced. The docking connector is preferably adapted to couple to different versions of an Apple iPod™.

Another embodiment of the present invention is directed toward a charger for a portable electronic device. The charger has a docking connector for receiving the portable electronic device. The docking connector includes an adjustable sidewall that can be extended to support the electronic device when the portable electronic device is docked in the docking connector. The adjustable sidewall is permanently coupled to the docking connector. A threaded member coupled to a rotating knob is used to extend and retract the adjustable sidewall. An extendable neck supports the docking connector above a 12-volt car outlet adapter.

Yet another embodiment of the present invention is directed toward a dock adapter for an accessory such as a charger for a portable electronic device. The dock adapter is adapted to physically and electrically couple the accessory to the portable electronic device. The dock adapter is permanently coupled to the accessory and includes an adjustable member for gripping the portable electronic device when the portable electronic device is coupled to the accessory. The adjustable member has a threaded member having a support pad for supporting a surface of the portable electronic device and knob for rotating the threaded member to extend the support pad to support the portable electronic device. The dock adapter is preferably adapted to couple to different versions of an Apple iPod™.

DETAILED DESCRIPTION OF THE INVENTION

Figure 1A:
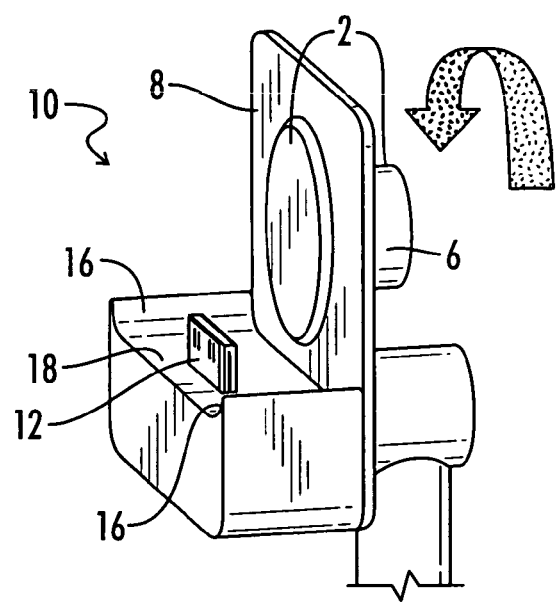
FIG. 1(a) is an illustration of a docking adapter constructed in accordance with an embodiment of the present invention having its support plate retracted.
Figure 1B:
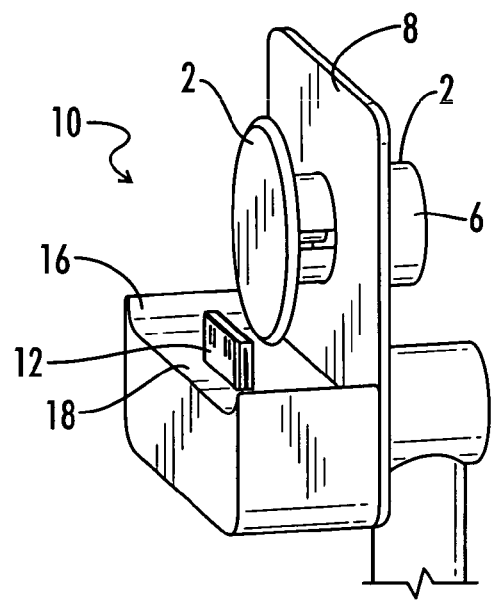
FIG. 1(b) is an illustration of a docking adapter constructed in accordance with an embodiment of the present invention having its support plate extended.

Referring now to FIGS. 1(a) and 1(b), illustrations of a docking adapter 2 constructed in accordance with an embodiment of the present invention having its support plate retracted, FIG. 1(a), and extended, FIG. 1(b) are shown. The docking adapter 2 is designed to allow the dock connector 10 receive devices having different outer dimensions. The docking adapter 2 has a support plate 4 having a knob 6 coupled thereto that can be rotated to extend or retract the support plate 4. In the embodiment shown, the docking adapter 2 is positioned on the back face 8 of the docking connector 10. The docking connector 10 has an electrical connector 12 for electrically coupling to the input/output port of a portable electronic device. The docking connector 10 is designed to couple to a portable electronic device such that the electrical connector 12 establishes an electrical connection with the portable electronic device and the sides 16, base 18 and back face 8 physically hold the portable electronic device in the desired position. In the embodiment shown, the docking adapter 2 effectively alters the distance to the back face 8. However, a similar approach can be used to alter the distance to the sides 16 if desired.

To use the docking adapter 2, the support plate 4 is retracted and the portable electronic device positioned in the docking connector 10 such that the electrical connector 12 of the dock 10 is coupled to the electrical connector of the portable electronic device. The knob 6 of the docking adapter 2 is then turned to extend the support plate 4 until it comes into contact with the back of the portable electronic device such that the portable electronic device is firmly supported in the desired position in the docking connector 10. Thus, the docking adapter 2 allows the docking connector 10 to receive different sizes portable electronic devices, such as the various sizes of the Apple iPods™, wherein the distance between the electrical output connector of the portable electronic device and the back surface of the device varies. In addition, the docking adapter 2 is physically coupled to the docking connector 10 such that it is always available when needed and can not be lost like removable inserts. Thus, the embodiment shown in FIGS. 1(*a*) and 1(*b*) represents a substantial improvement upon the prior art.

Figure 2A:
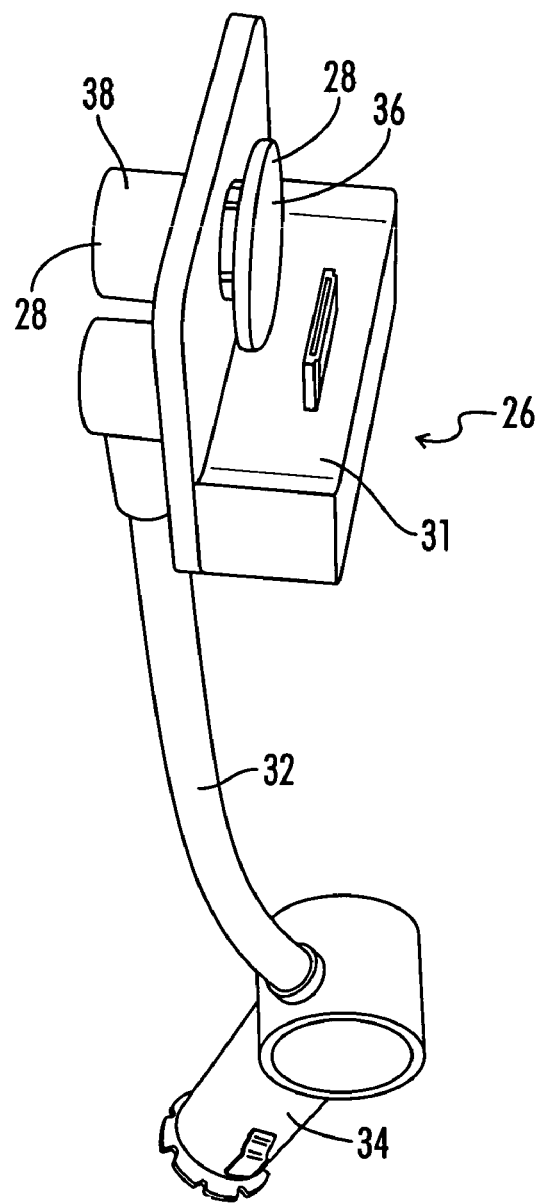
FIG. 2(a) is an illustration of a car charger constructed in accordance with an embodiment of the present invention.
Figure 2B:
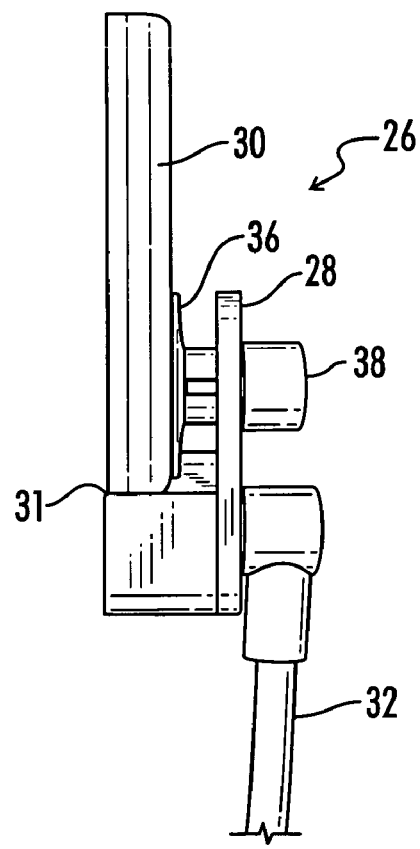
FIG. 2(b) is an illustration of a car charger constructed in accordance with an embodiment of the present invention coupled to a portable electronic device.

Referring now to FIG. 2(*a*) an illustration of a car charger accessory 26 having a docking adapter 28 constructed in accordance with an embodiment of the present invention is shown. The charger consists of a docking connector 31 mounted on an extendable arm 32 which is in turn connected to a 12-volt automobile outlet adapter 34. In FIG. 2(*b*), the car charger accessory 26 is shown from a side perspective holding a digital music player 30. The support pad 36 of the docking adapter 28 has been extended by turning the knob 38 such that the support pad 36 is pressed against the back of the portable electronic device 30 in the dock 31. Since the supporting back plate 36 of the dock 31 can be selectively extended and retracted, the dock 31 can advantageously accommodate digital music players 30 of many different sizes.

The above dock adapter provides a number of advantages over the prior art. For example, the adapter allows a single accessory to be constructed that can accommodate a range of different size devices. This reduces stocking and inventory costs for suppliers and increases flexibility of use for consumers. In addition, the adapter is physically coupled to the dock so that it can not be lost or misplaced such as prior art inserts that have been used to reconfigure dock connectors. Furthermore, the extension of the adapter is infinitely adjustable between its maximum and minimum extension distances so that it can receive devices of any thickness within its designed range. Thus, the adapter can easily handle newly designed devices without any alterations.

Although there have been described particular embodiments of the present invention of a new and useful Adjustable Dock for Portable Electronic Devices herein, it is not intended that such references be construed as limitations upon the scope of this invention except as set forth in the following claims.

What is claimed is:

1. An accessory for use with a portable electronic device, said accessory comprising:
   a supporting body having a docking cavity with a bottom portion and a sidewall;
   an electrical connector positioned on said bottom portion that is adapted to electrically connect said accessory to said portable electronic device;
   an extendable portion, comprising a threaded member having a support pad coupled to one end, coupled to said sidewall that adjustably extends with respect to said electrical connector from a first supporting position wherein said extendable portion supports a first type of portable electronic device connected to said electrical connector having a first width to a second supporting position wherein said extendable portion supports a second type of portable device connected to said electrical connector having a second width different than said first width.

2. The accessory of claim 1 wherein said portable electronic device is a digital music player.

3. The accessory of claim 1 wherein said extendable member is permanently coupled to said sidewall.

4. The accessory of claim 1 wherein said accessory further comprises a charger for recharging a power supply of said portable electronic device.

5. The accessory of claim 1 further comprising a knob for rotating said threaded member to extend said support pad to support said portable electronic device.

6. A charger for a portable electronic device, said charger comprising:
   an electrical connector positioned on a bottom portion of a docking cavity that is adapted to electrically connect said charger to said portable electronic device;
   an extendable portion coupled to a sidewall of said docking cavity that adjustably extends with respect to said electrical connector from a first supporting position wherein said extendable portion supports a first type of portable electronic device connected to said electrical connector having a first width to a second supporting position wherein said extendable portion supports a second type of portable device connected to said electrical connector having a second width different than said first width; and
   a threaded member for extending and retracting said extendable portion.

7. The charger of claim 6 further comprising an extendable neck for supporting said docking cavity.

8. The charger of claim 6 further comprising a threaded member for extending and retracting said extendable portion.

9. The charger of claim 8 further comprising a knob for rotating said threaded member.

10. The charger of claim 6 wherein said extendable portion is permanently coupled to said sidewall.

* * * * *